Nov. 20, 1962
M. A. HALL
3,064,788
COIN CHUTE
Filed March 29, 1960
9 Sheets-Sheet 1
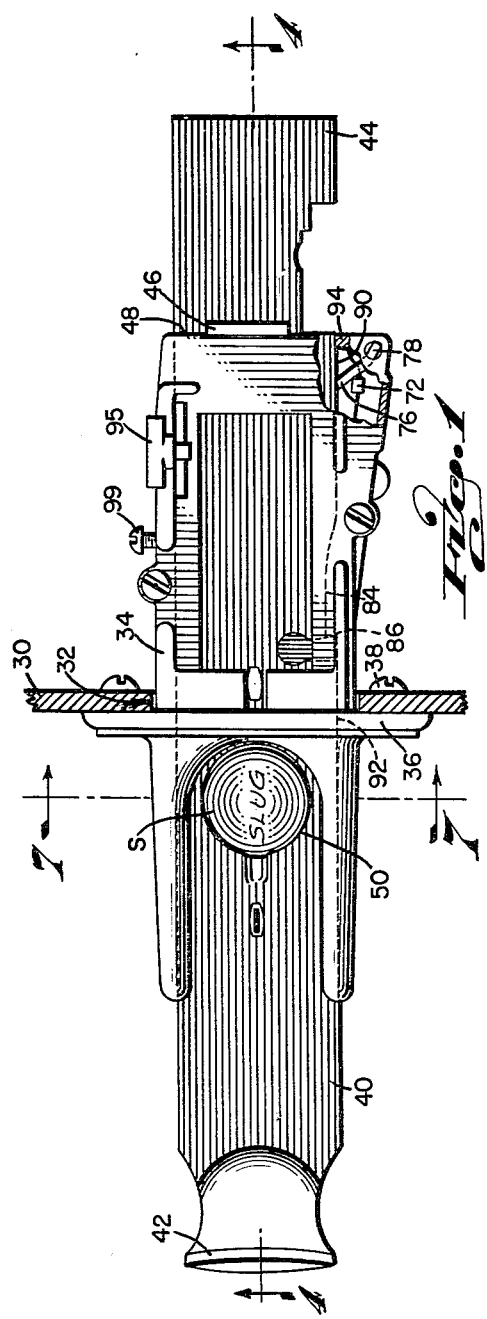
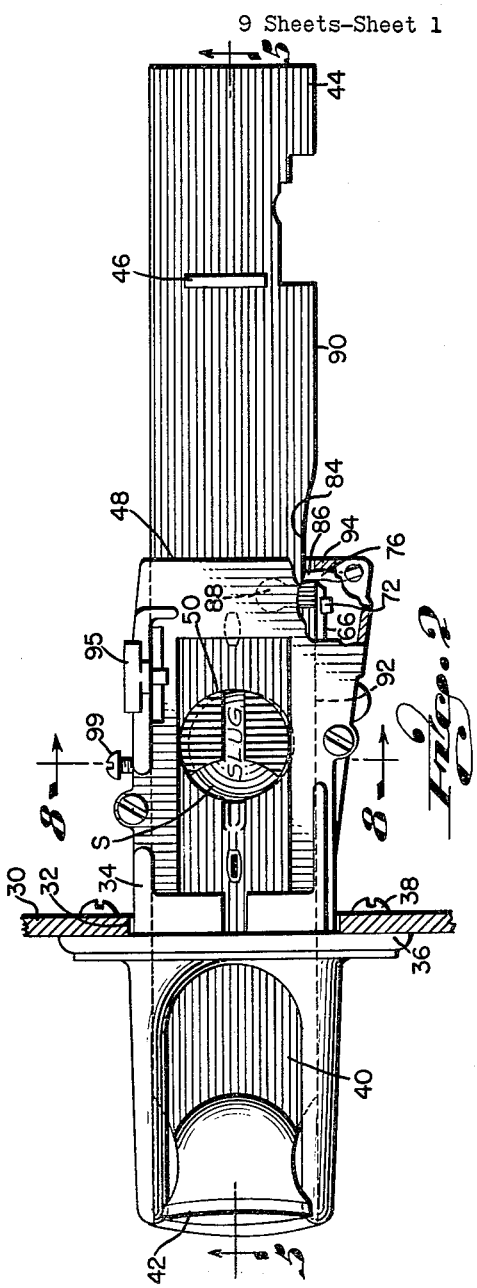
INVENTOR.
MITCHELL A. HALL
BY
J. Warren Kinney Jr.
ATTORNEY Nov. 20, 1962 M. A. HALL 3,064,788
COIN CHUTE
Filed March 29, 1960 9 Sheets-Sheet 2
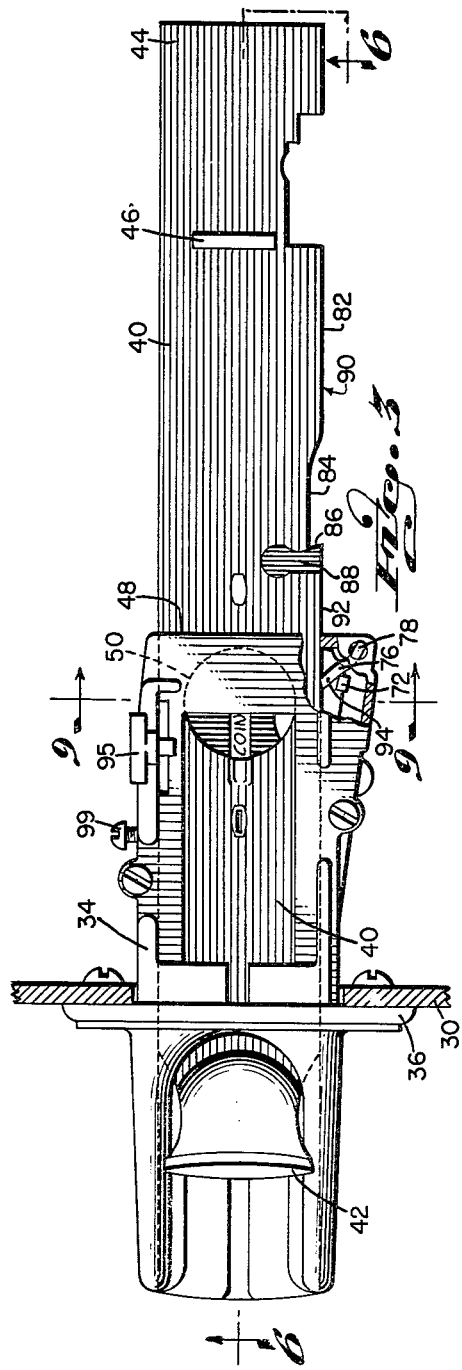
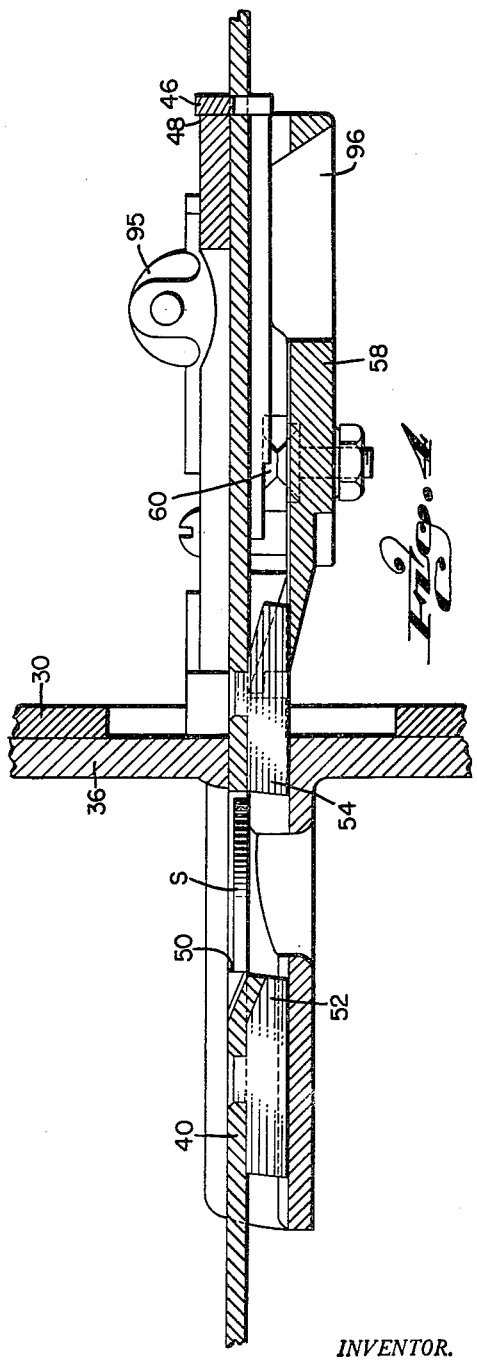
INVENTOR.
MITCHELL A. HALL
BY
J. Warren Kinney Jr.
ATTORNEY

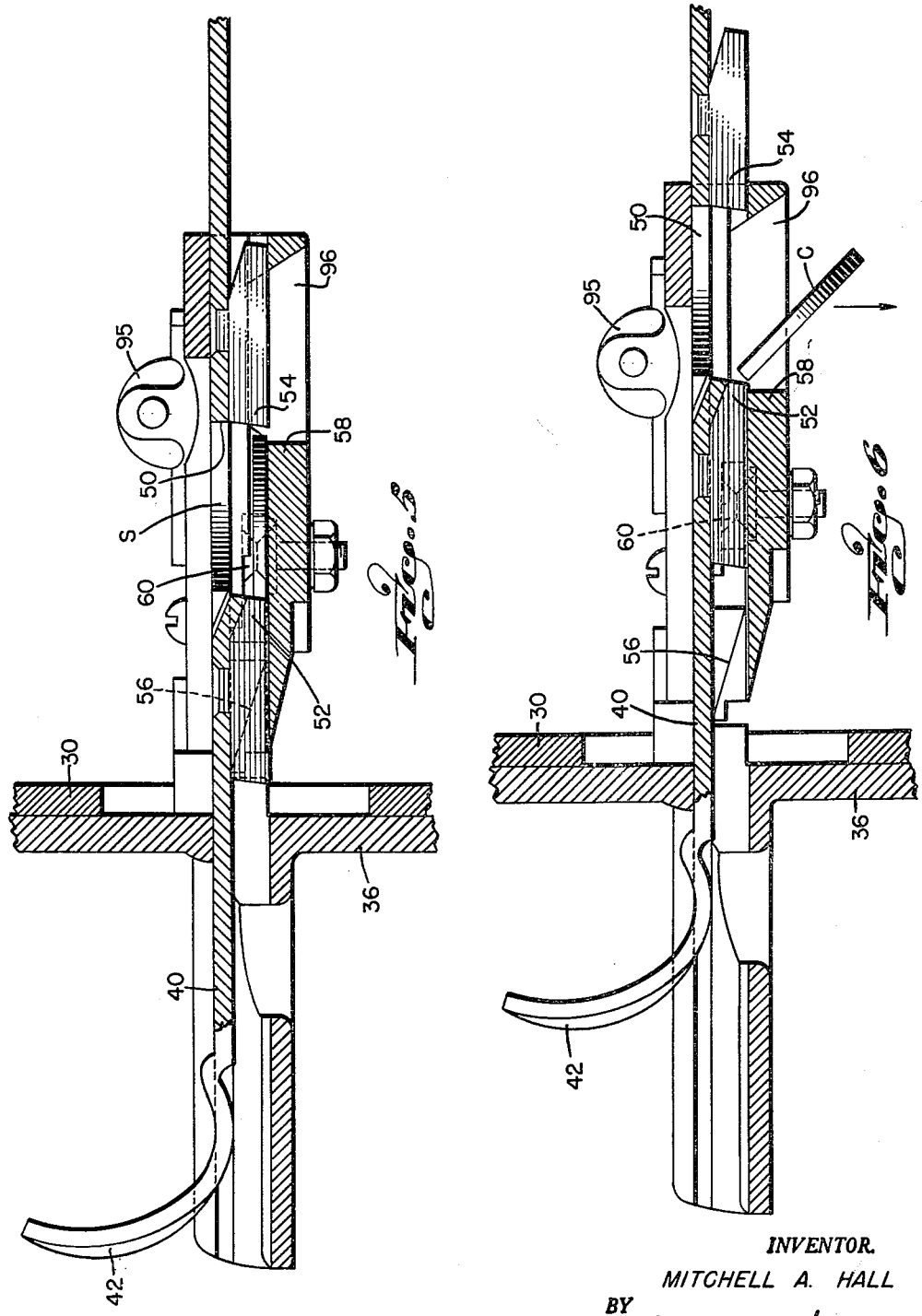

Nov. 20, 1962 M. A. HALL 3,064,788
COIN CHUTE
Filed March 29, 1960 9 Sheets-Sheet 4

INVENTOR.
MITCHELL A. HALL
BY
J. Warren Kinney Jr.
ATTORNEY

Nov. 20, 1962 M. A. HALL 3,064,788
COIN CHUTE
Filed March 29, 1960 9 Sheets-Sheet 5

INVENTOR.
MITCHELL A. HALL
BY
J. Warren Kinney Jr.
ATTORNEY

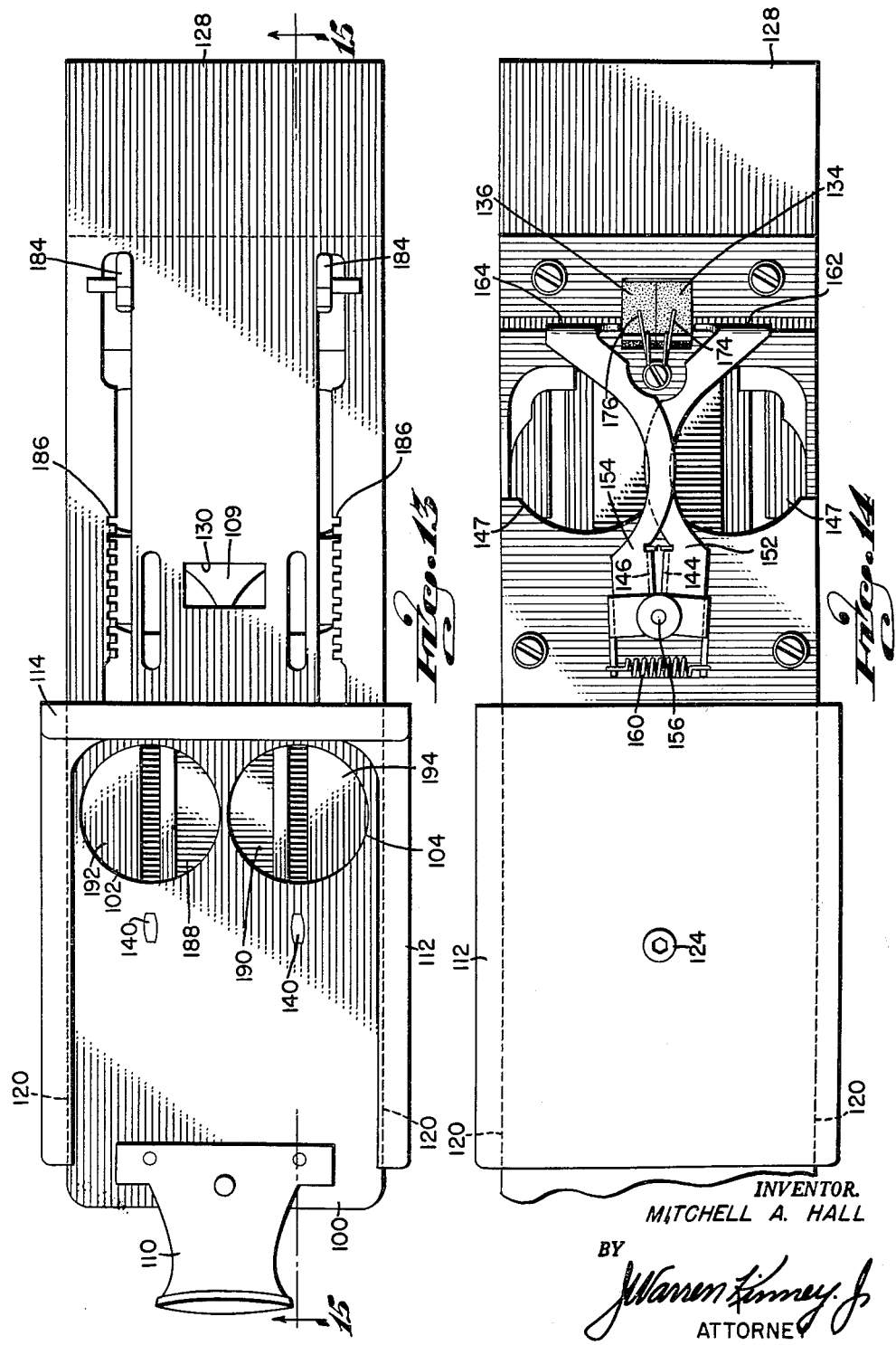

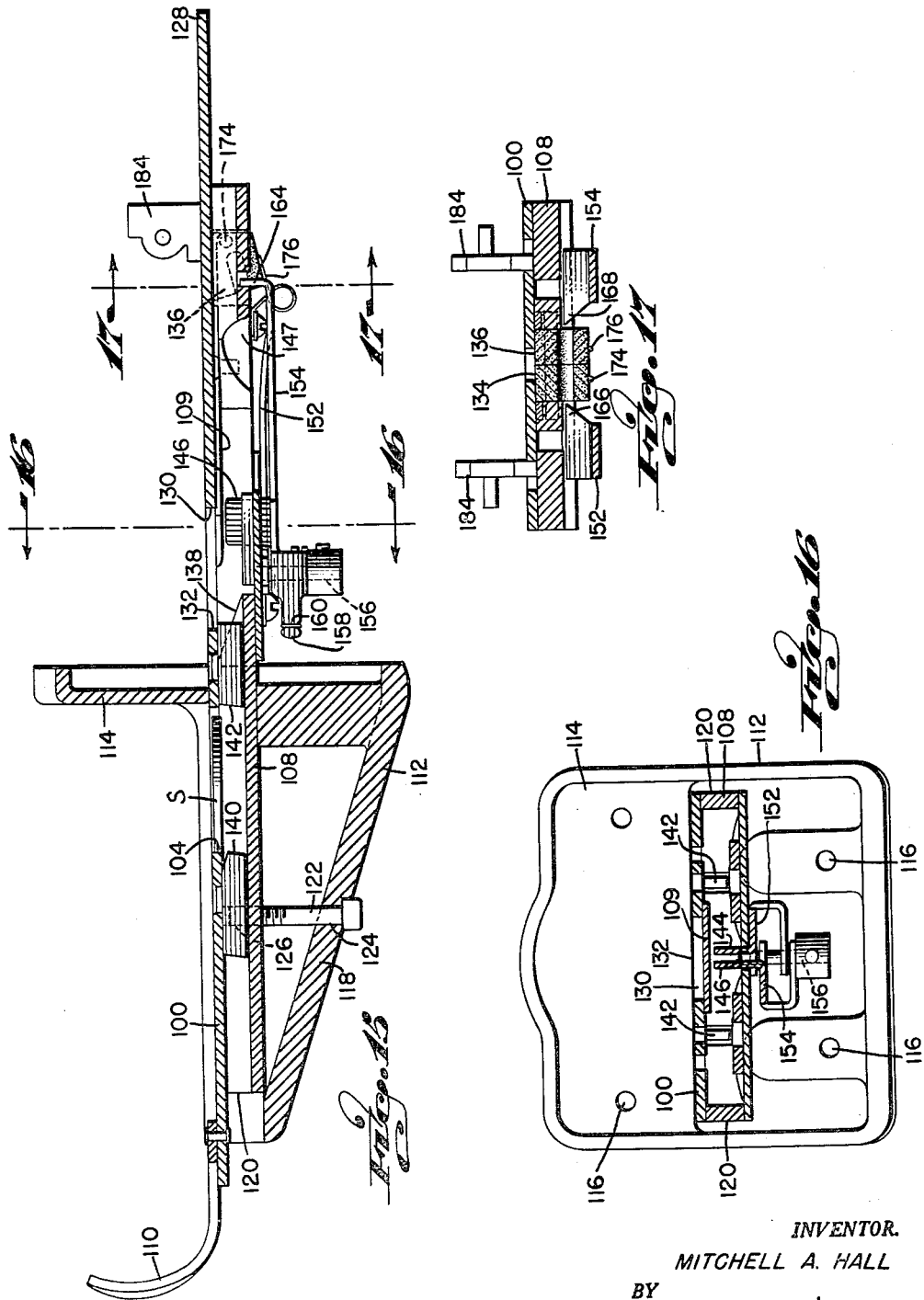

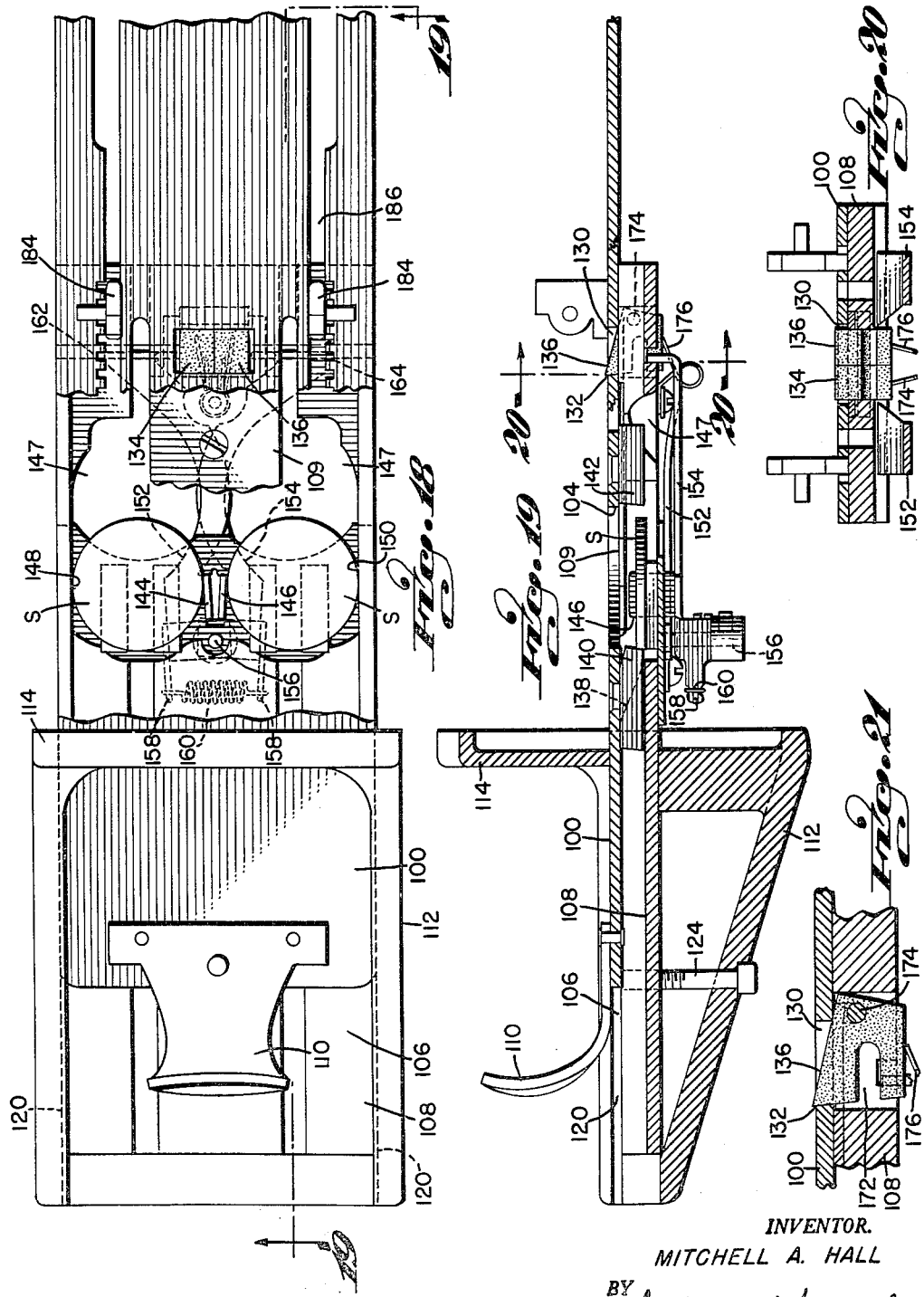

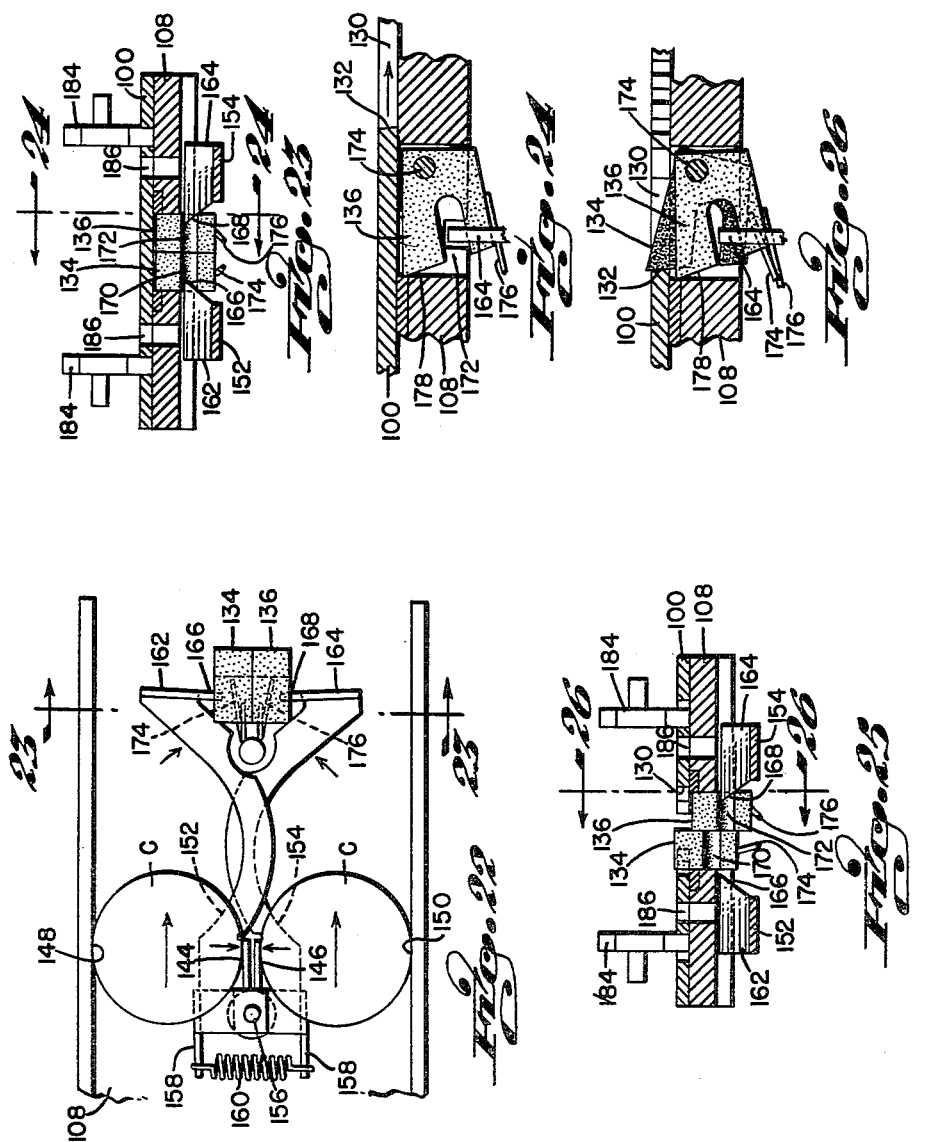

United States Patent Office 3,064,788
Patented Nov. 20, 1962

3,064,788
COIN CHUTE
Mitchell A. Hall, 445 Rossford Ave., Fort Thomas, Ky.
Filed Mar. 29, 1960, Ser. No. 18,325
15 Claims. (Cl. 194—55)

This invention relates to an improvement in coin slides.

A primary object of the present invention is to provide, in conjunction with the coin-calipering mechanism of a coin slide assembly, improved latch means for precluding illicit actuation of the coin slide, which latch means is entirely separate from the calipering mechanism.

Heretofore the coin caliper mechanism of coin slides included a latch arm the free end of which was provided with an abutment engageable with the hardened stop insert of a coin slide. Whenever an attempt was made to operate the coin slide using an undersized coin, the abutment of the latch arm would be positioned to delimit forward motion of the slide by reason of the hardened stop insert of the slide engaging said abutment, to prevent fraudulent acquisition of goods. Experience has demonstrated that it is not uncommon for persons to abuse coin slides, particularly when their tempers have been shortened such as, by way of example, when an undersized coin is unsuccessfully utilized in an effort to spuriously actuate a coin slide. The frustrated customer will quite often oscillate the coin slide vigorously and with malicious intent to damage, by slamming the same forward until it engages the abutment member, and in those instances wherein said abutment members are secured to and/or comprise a part of the latching arm, such abuse will eventually impair the function and operation thereof.

Another object of the invention is to provide a coin slide housing which is securely though releasably engageable with a face plate housing.

Another object of the invention is to provide latch means engageable by the hardened insert stop of a coin slide incident to the attempted actuation of such a coin slide utilizing an undersized coin or token, which latch means is so constructed and arranged as to be progressively shifted into interfering relationship with the hardened insert stop of the coin slide incident to attempted actuation of said slide.

Still a further object of the invention is to provide a novel double coin chute adapted to simultaneously receive two genuine coins the presence of both of which is necessary in order to permit complete actuation of the slide plate.

These and other objects are attained by the means described herein and disclosed in the accompanying drawings in which:

FIG. 1 is a top plan view of a typical coin slide embodying the teachings of the present invention, showing a slug initially associated therewith.

FIG. 2 is a view similar to FIG. 1 illustrating the maximum forward travel of the coin slide permissible when endeavoring to operate same using a slug or undersized coin.

FIG. 3 is a view similar to FIG. 2, illustrating the fully advanced movement of the coin slide of FIG. 1 when using a proper sized coin.

FIG. 4 is a sectional view taken on line 4—4 of FIG. 1.

FIG. 5 is a sectional view taken on line 5—5 of FIG. 2.

FIG. 6 is a sectional view taken on line 6—6 of FIG. 3.

FIG. 13 is a top plan view of a two-coin slide bar embodying the teachings of the present invention.

FIG. 14 is a bottom view of the device of FIG. 13.

FIG. 15 is a sectional view taken on line 15—15 of FIG. 13.

FIG. 16 is a sectional view taken on line 16—16 of FIG. 15.

FIG. 17 is a sectional view taken on line 17—17 of FIG. 15.

FIG. 18 is a view similar to FIG. 13 illustrating the relationship of the various elements of the coin calipering and slide arresting mechanisms when undersized coins or slugs are utilized to effect actuation of the slide bar.

FIG. 19 is a sectional view taken on line 19—19 of FIG. 18.

FIG. 20 is a sectional view taken on line 20—20 of FIG. 19.

FIG. 21 is an enlarged fragmentary view of the movable latch means of FIG. 19.

FIG. 22 is a fragmentary view of a portion of FIG. 18 illustrating the relationship of the parts when proper sized coins are utilized for effecting actuation of the slide bar.

FIG. 23 is a sectional view on line 23—23 of FIG. 22.

FIG. 24 is an enlarged fragmentary view similar to FIG. 21 illustrating the relationship of the movable latch members when proper coins or tokens have been used to actuate the slide bar.

FIG. 25 is a view similar to FIG. 23, illustrating the relationship of the movable latches when the slide bar is actuated by an undersized coin or token and a proper sized token or coin.

FIG. 26 is a sectional view on line 26—26 of FIG. 25.

Figure 7:
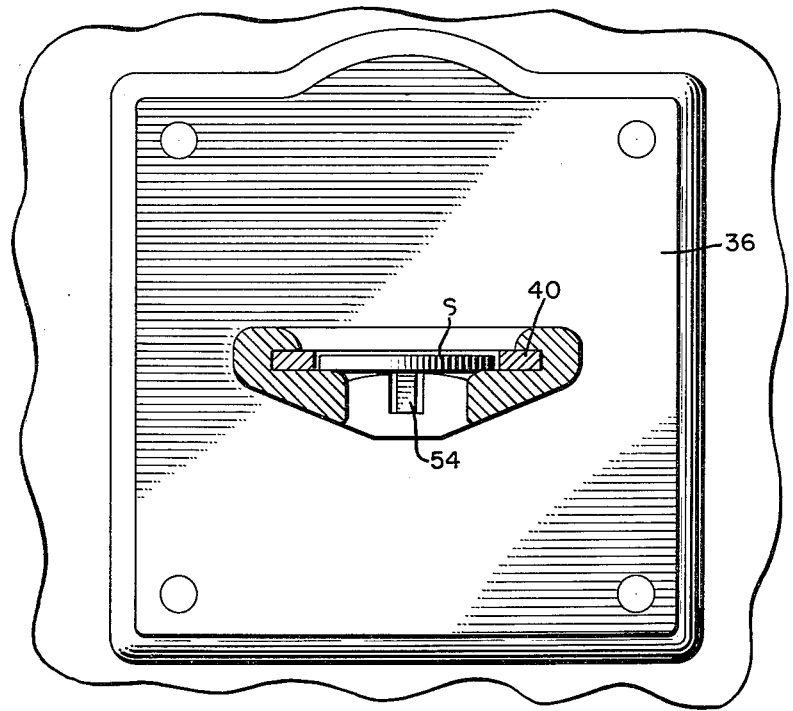
FIG. 7 is a view taken on line 7—7 of FIG. 1.
Figure 8:
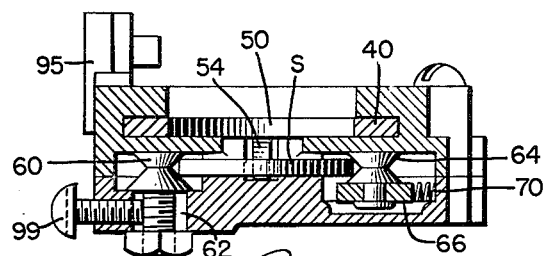
FIG. 8 is a sectional view taken on line 8—8 of FIG. 2.
Figure 9:
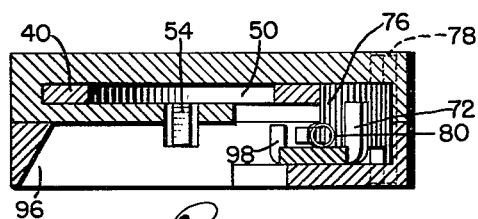
FIG. 9 is a sectional view taken on line 9—9 of FIG. 3.

With particular reference to FIG. 1, the numeral 30 denotes generally a support panel having an opening 32 therein for the reception of housing portion 34 of the coin slide which includes a face plate 36 securely though releasably fastened to the panel by means of fastening means 38. The numeral 40 denotes generally a slide plate one end of which is provided with or terminates in a handle portion 42, and the other end of which terminates in a forward end 44 which is adapted to activate a suitable dispensing mechanism or the like (not shown) in response to a full, forward stroke of the slide plate. A stop member 46 secured to and carried by the stop plate abuts end 48 of housing 34 for establishing the fully retracted position of the slide plate relative to the housing. The fully advanced position of the slide plate is illustrated by FIGS. 5 and 6.

The slide plate is provided with a coin receptive opening 50 and coin-engaging means forwardly and rearwardly of said opening for advancing and retracting a coin. For ease of designation these latter two elements will hereinafter be referred to as coin pushers 52 and 54, wherein the numeral 52 denotes the coin pusher which advances a coin and wherein the numeral 54 denotes the coin pusher which is operable to retract a coin or slug incident to withdrawal of the slide plate as from the position illustrated in FIG. 2 to the position of FIG. 1. It will be noted that coin pushers 52 and 54 are illustrated in FIGS. 4, 5 and 6.

Upon deposit of a coin or slug in the aperture 50 of FIG. 1, the slide 40 may be manually advanced to advance the coin or slug to an intermediate location (FIG. 2) at which it is positioned for calipering to test the genuineness thereof. The coin or slug so advanced travels down an incline 56 (FIG. 5), and into a bottom plate 58 of the coin slide housing, where it remains under the control of pushers 52 and 54. While sliding upon the bottom plate 58, the coin or slug is subjected to a calipering test, and if it passes the test, it will be discharged as in FIG. 6 through the coin discharge opening 59 and into a suitable receptable, not shown. The slide 40 thereupon may be manually advanced to its inward limit, to activate a dispensing mechanism or the like.

If the coin or slug fails to pass the caliper test, it will be rejected by means to be described, and may be retrieved by withdrawing the slide to the initial position of FIG. 1, the pusher 54 performing to return the coin or slug so rejected.

Figure 10:
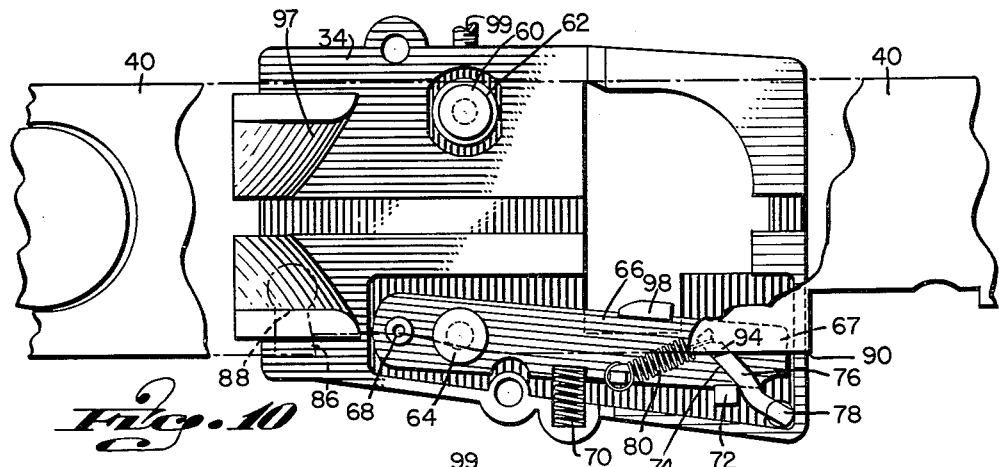
FIG. 10 is an enlarged, fragmentary top view, partly in section, of the coin calipering and slide arresting device of the present invention.
Figure 11:
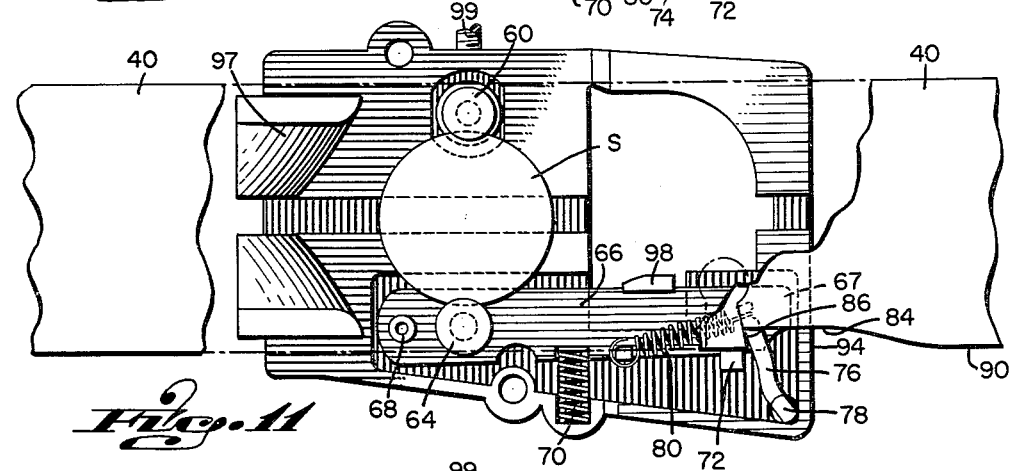
FIG. 11 is a view of the device of FIG. 10 showing the operative relationship of the parts when a slug or undersized coin is utilized in an effort to effect operation of the slide bar.
Figure 12:
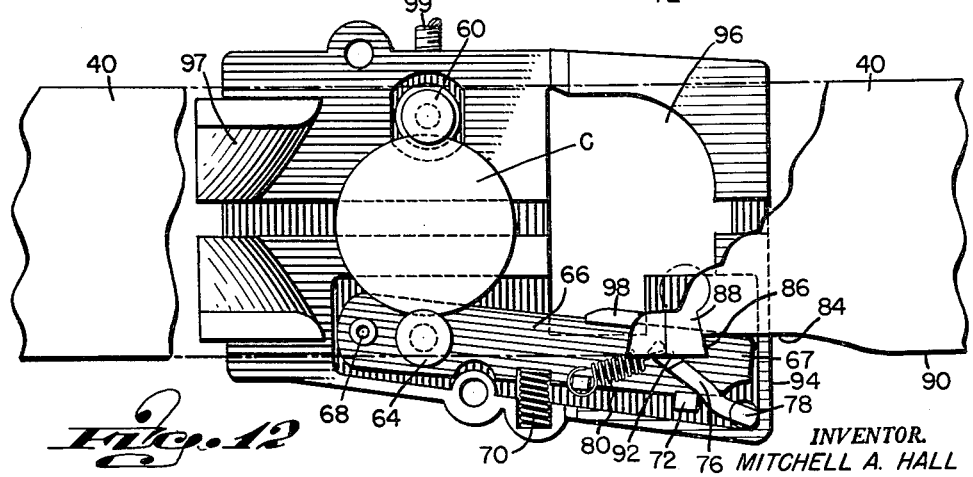
FIG. 12 is a view similar to FIG. 11, showing the relationship of the various elements during those periods of time when a genuine coin is used to actuate the slide bar.

With particular reference now to FIGS. 10, 11 and 12, the numeral 60 denotes an adjustable measuring button mounted for limited lateral adjustment within an opening 62 provided in the slide housing. The numeral 64 denotes a second measuring button secured to and carried by a measuring or calipering lever 66 which is pivotally secured as at 68 relative to housing 34. A spring 70 normally urges the coin-calibrating lever 66 in a counterclockwise direction about pivot 68.

The free end 67 of lever 66 is provided with an upstanding cam follower 72 adapted to engage the cam face 74 of a locking pawl 76 pivotally mounted upon the housing as at 78, for movement to and from a slide intercepting position. A spring 80 normally urges the locking pawl in a counter-clockwise direction about its pivot 78 whereby face 74 thereof will normally engage the follower 72. It will therefore be understood that any pivotal movements of lever 66 will induce a shifting of pawl 76 about its pivotal mounting 78, under the combined reactions of spring 80 and cam 72.

The lateral spacing between measuring buttons 60 and 64 is of a dimension less than the diameter of a proper coin or token, so that movement of a proper coin or token between the buttons will result in the measuring or calipering lever 66 being swung outwardly in a clockwise direction about its pivotal mounting 68. In FIG. 11 the letter S denotes a slug having a diameter less than the diameter of a proper coin, C, of FIG. 12. The resultant effects upon lever 66 are indicated in these drawing figures.

As best illustrated by FIG. 3, the slide 40 has one of its side edges 82 cut away or notched, to provide a longitudinal recess 84 terminating in a shoulder or abutment 86 extending transversely of the slide. The shoulder or abutment 86 by preference is reinforced against mutilation, this being achieved by insetting into the softer metal of the slide a hardened metal key 88 which forms the shoulder or abutment. The recessed portion or section 84 is flanked by main track portions 90 and 92, constituted of the slide edge. For purposes of distinction, track portion 90 may be considered the primary track portion or section, whereas 92 is the secondary track portion or section, these sections being in substantial alignment with one another but interrupted by the recessed section 84.

The free end portion 94 of pawl 76 may ride upon the track sections 90 and 92, and may drop into recess 84, as slide 40 is moved lengthwise relative to housing 34. Said end portion 94 is yieldingly urged toward the track sections by the force of spring 70 acting against the calipering lever and translating the lever movement to pawl 76 through the agency of cam follower 72.

From the foregoing, it will be understood that pawl 76 rides upon track section 90 (FIG. 1) when slide 40 is withdrawn to initial position. As the slide 40 is manually advanced (FIG. 2), pawl 76 may drop into recess 84 and assume a position substantially at right angles to the slide edge, thereby to abut the hardened shoulder 86 of the slide and prevent further advancement thereof. In this position of pawl 76, the calibrating lever 66 and its extension or follower 72 are free of contact with the pawl and the slide 40. Accordingly, the full impact of slide advancement, however severe it may be, is directed against and received solely by pawl 76. None of the impact is transmitted either directly or indirectly to the coin measuring or calipering lever 66, wherefore this sensitive element of the assembly is protected always against damaging forces resulting from abusive manipulation of the slide.

As FIG. 2 indicates, the pawl 76 in the slide intercepting position is rigidly backed up by the rear wall 94 of the main housing, which it abuts. The pawl accordingly can withstand heavy and repeated impacts directed thereto by shoulder 86, without likelihood of mutilation or other damage. Should abusive impacts succeed in damaging the pawl, however, it is readily replaceable at small expense. Of primary importance is the fact that the calipering mechanism is never subject to damaging forces or impacts.

The conditions above described are based on the assumption that a slug S of substandard size was inserted in the coin aperture 50, or that no coin or slug was inserted. Under such conditions, FIG. 11 is applicable for showing inability of slug S to activate the calipering lever 66, which in the presence of a proper coin would be shifted to the FIG. 12 position for displacing pawl 76 to non-intercepting relationship with stop or shoulder 86. As FIG. 12 indicates, a proper outward deflection of lever 66 about its pivot 68 advances the follower 72 sufficiently to permit disposition of pawl 76 from the path of travel of shoulder 86, thereby allowing the slide to proceed to its innermost limit of travel. In the FIG. 12 disclosure, C represents a coin of standard proportions capable of properly activating the calipering lever 66 through the intermediary of measuring button 64 carried by said lever. A coin or slug of substandard diameter will of course fail to activate the calipering lever to the extent necessary for displacing the pawl from intercepting relationship with slide shoulder 86.

From the disclosure of FIG. 12, it will be understood that coin C subsequently to measurement will pass to the right between buttons 60 and 64, and will drop from the coin slide through the discharge opening 96 (FIGS. 12 and 16). As the coin leaves the buttons, lever 66 under the influence of spring 70 will tend to return to the normal position of FIG. 11, but will be prevented from doing so by reason of the fact that pawl 76 is now riding on track section 92, while depressing the follower 72 carried by the calipering lever. This condition prevails until the slide 40 has been fully advanced and subsequently retracted to a position at which pawl 76 may drop into the slide recess 84, when the pawl assumes a position of substantial perpendicularity to the slide edge, as in FIG. 11, and thereby offers no obstruction to movement of follower 72. FIG. 10 shows the normal relationship of parts when the slide is fully retracted.

It should be understood that the coin slide apparatus ordinarily will embody coin testing and rejecting devices additional to the calipering means herein described in detail, but since such additional devices form no part of the present invention, no effort has been made herein to disclose them. It may be noted however that 97 indicates guide means for properly directing coins or slugs to the calipering device, and 98 indicates a deflector on the calipering lever for properly directing accepted coins to the discharge opening 96. The screw at 99 serves to lock the adjustable measuring button 60 in preset positions for accurate coin measurement. At 95 is indicated generally a ratchet mechanism, common to existing coin slides, for preventing oscillation of the slide, once a coin has been accepted, in an effort to bring about more than one dispensing operation of the mechanism controlled by the coin slide.

Attention is now directed to FIGS. 13 and 18, disclosing a double coin slide of improved design embodying novel means to prevent effectual slide operation in the event that one or both of the two coins required to actuate the device are undersized.

The numeral 100 indicates a slide in the form of a plate, of sufficient width to carry a pair of coin receptive apertures 102 and 104 arranged in side-by-side relationship. The slide is supported for lengthwise reciprocation by means of a handle 110, upon the upper planar face 106 of a block-like housing 108, and a medial fixed baffle plate 109 secured to the housing.

Support for the housing 108 may be provided by a face plate 112 having an upright wall 114 adapted for securement to an upright wall of a cabinet or the like, with the use of fasteners inserted through openings 116 in the face plate. Integral with the wall 114 is a forward extension 118 in which is provided a pair of opposed side channels 120 accommodating the side edges of the housing 108. The face plate 112 may be removably fixed relative to housing 108 in any suitable manner, as by means of a screw 122 passing upwardly through an opening 124 of the face plate, and having its threaded end 126 anchored in the material of the housing. With this arrangement, an exchange of face plates may be effected by simply sliding the face plate off the outer end of housing 108. The face plate thereby is rendered entirely separate from the housing, and may be replaced by others of differing design or quality.

The inner end 128 of the slide 100 is adapted, upon full advancement of the slide, to actuate any desired form of dispenser (not shown). It is therefore important to prevent a full advancement of the slide unless proper coins are deposited in the apertures 102 and 104.

Intermediate the end 128 of the slide and the location of coin receptive apertures 102 and 104, the slide is provided with a central aperture 130. This aperture has a forward edge 132 which functions as a shoulder comparable with shoulder 86 of FIG. 12, to engage a pair of pawls 134 and 136 whenever improper coins or slugs are used in an effort to actuate the slide. The pawls 134 and 136 are independently operative to engage shoulder 132, depending upon the ability of the coins to pass their respective calipering tests. That is, if one coin passes the test and the other does not, the pawl controlled by the substandard coin or slug will engage shoulder 132 and preclude full advancement of the slide. If both coins or slugs are substandard and fail to pass the calipering test, both pawls will engage shoulder 132 and preclude full advancement of the slide. On the other hand, two coins passing the test will effect retraction of the pawls to avoid contact thereof with shoulder 132, so that the slide may be advanced to its limit of travel for actuating a dispensing mechanism or the like.

Coins or slugs inserted into the slide openings of FIG. 13 will, upon movement of the slide, be advanced along housing 108 and down the incline 138 thereof, until they reach the calipering station. Slugs S and S are shown at this stage in FIGS. 18 and 19.

The slugs having left the slide openings 102 and 104, are subject to movement with the slide by engagement with the pushers 140 and 142 fixed to the underface of the slide. At the intermediate stage of advancement illustrated by FIGS. 18 and 19, slugs S are required to pass a pair of calipering lugs 144 and 146 which may be moved toward one another, provided that the slugs are large enough in diameter to displace the lugs. As FIG. 18 indicates, the slugs bear against the housing at points 148–150 while undergoing calipering. Depending upon the ability of slugs or coins to sufficiently move the calipering lugs 144 or 146, such slugs or coins will be either rejected by latching of the coin slide in the FIG. 18 position, or accepted with consequential further advancement of the slide to fully extended position. Accepted coins fall through discharge openings 147 of the housing.

The calipering mechanism is best illustrated by FIG. 22. Here a pair of proper coins C, C, are shown undergoing measurement by lugs 144 and 146. The lugs are integral upturned parts of the calipering levers 152 and 154, both of which levers are supported for independent rocking movement upon a stationary pivot 156 fixed relative to housing 108. Measuring lug 144 is an integral part of lever 152, and lug 146 is an integral part of lever 154.

Near the supporting pivot 156, each calipering lever may be provided with an extension 158, and between the extensions may be tensioned a spring 160 serving to urge the extensions toward one another, while at the same time yieldingly urging the measuring lugs 144 and 146 apart. Accordingly, when proper coins such as C, C, pass the measuring lugs, they independently move the lugs toward each other, with a resultant shifting of the free ends 162 and 164 of the calipering arms toward one another. As will be understood, the calipering arms may be kept under tension by yielding means differing from the spring arrangement herein indicated by way of example.

If one of the coins in FIG. 22 is undersized, or happens to be a slug of substandard diameter, said one coin or slug will fail to sufficiently shift the calipering lever which measures it, with the result that the free end of such calipering lever will move but slightly or perhaps not at all.

The free or head ends of the calipering levers, as indicated by FIGS. 23 and 25, are developed to provide inwardly directed cam noses 166 and 168 which may enter transverse passages or apertures 170 and 172 of the shiftable pawls 134 and 136, respectively. Each of the pawls is to be independently supported upon a common transverse pivot 174 for limited rocking movement, so that the nose of either pawl may be projected upwardly, at as 134 of FIG. 26, into the path of movement of coin slide 100, to enter the slide aperture 130 and engage the shoulder 132 thereof, for stopping the slide advancement.

Referring further to FIG. 26, it is seen that pawl 134 is elevated into the plane of travel of the slide 100, whereas pawl 136 is restrained and held beneath the plane of the slide. This same condition is shown in FIG. 25, wherein it is apparent that the cam nose 168 of calipering lever 154 has entered the pawl aperture 172 for lowering the pawl, whereas the cam nose of the other calipering lever 152 has imposed no such restraint upon pawl 134. The meaning of this is, that the coin which actuated the calipering lever 154 passed the calipering test, resulting in disposition of pawl 136 to inoperative or non-intercepting slide position; on the other hand, the substandard coin or slug subject to measurement by calipering lever 152 failed to pass the test, with the result that cam nose 166 failed to enter and lower the pawl 134 to a slide non-intercepting position. Thus, the spurious coin or slug was directly responsible for latching the slide against further advancement beyond the FIG. 18 position.

It should here be noted that both pawls 134 and 136 are constantly yieldingly urged upwardly, or toward the underface of the slide, by small leaf springs 174 and 176 anchored to the slide housing. The force of these springs tending always to elevate the pawls to slide intercepting position, is overcome by entry of the cam noses 166 and 168 into the pawls at 170 and 172. The forward impact edges 178 of the pawls preferably are slightly undercut or disposed at an acute angle to the upper edges thereof, to produce a slight wedging action against slide shoulder 132 for the purpose of preventing downward camming of the pawls in the event that the slide is subjected to violent reciprocation with an improper coin or slug in either or both slide openings.

FIG. 20 shows the pawls 134 and 136 projected upwardly by the springs 174 and 176 when slide aperture 130 is in register with the pawls as depicted by FIGS. 18 and 19, the slugs S or coins being undersized and therefore ineffective to properly operate the calipering levers. FIG. 25 indicates the pawl disposition in the event that one slug, and one proper coin, are advanced to the calipering means by the slide. Under such conditions, one pawl serves to latch the slide.

FIG. 17 indicates the normal positions of the pawls, while the slide is fully retracted as in FIG. 15, the slide under such conditions serving to depress the pawls counter to the force of springs 174 and 176.

FIGS. 13 to 26 illustrate certain elements common to coin control devices, which for the purposes of the present disclosure are irrelevant and have no bearing upon the instant invention. For example, there is shown a pair of upright posts 184 upstanding upon the housing 108 and flanked by toothed slots 186 of the slide, these elements serving in common practice to support ratchet means preventing slide reciprocation in one direction after a proper coin has been accepted. Such ratchet mechanism is of no consequence to the present invention. It should be understood also that devices constructed in accordance with the present invention may embody various coin testing features additional to those herein disclosed, common amongst which are magnetic tests, thickness tests, and the like.

In conclusion, attention is directed to FIG. 13 showing at the locations 188 and 190, depressions in the upper surface of the main housing. The depressions 188 and 190 are at a lower elevation, and of lesser surface area, than areas 192 and 194 upon which rest the coins placed initially into the slide openings 102 and 104. Such coins therefore may rest flatwise upon the areas 192 and 194, in the plane of the slide, without contacting the depressed areas 188 and 190. In the event that one desires to retrieve coins placed within the slide openings 102 and 104, he may easily dislodge them from the openings by pressing thereon over the depressed areas, thereby tilting the coins to raise one edge above the slide where it is easily graped for removal.

What is claimed is:

1. A coin controlled device comprising in combination, an elongate coin-receptive apertured slide reciprocable between an initial position and a position of full advancement, an apertured housing reciprocably supporting said slide, coin-displaceable coin-calipering means on the housing normally in the path of movement of a coin advanced by the slide, and displaceable slide-locking means on the housing bodily movable in correspondency with movements of the coin calipering means, to stop advancement of the slide short of its position of full advancement in the event of failure of the coin to fully activate the coin-calipering means.

2. A coin controlled device comprising in combination, an elongate coin-receptive apertured slide reciprocable between an initial position and a position of full advancement, an apertured housing reciprocably supporting said slide, movable coin-calipering means on the housing in the path of movement of a coin advanced by the slide, a stop shoulder on the slide, a pawl separate from the coin-calipering means and shiftably supported upon the housing for movement into positions of engagement and disengagement with said stop shoulder, for respectively latching and releasing the slide at an intermediate position of slide advancement, and means controlled by the calipering means, for determining engagement and disengagement of the pawl with respect to the stop shoulder of the slide.

3. The device as set forth in claim 2, wherein the coin-calipering means and the pawl are mounted for movement about axes spaced from one another, said housing having a rigid back-up member in position to engage said pawl at the limit of the slide intercepting position of the pawl, whereby the coin-calipering means receives none of the impact resulting from the slide shoulder engaging the pawl during advancement of the slide.

4. A coin controlled device comprising in combination, an elongate coin-respective apertured slide reciprocable between an initial position and a position of full advancement, an apertured housing reciprocably supporting said slide, coin-calipering means on the housing including a shiftable lever movable into the path of travel of a coin advanced by the slide, a stop shoulder and an adjacent track on the slide, a pawl shiftably supported by the housing and having a nose end for engagement and disengagement with the track and the stop shoulder of the slide, yielding means tending to move the pawl from engagement with the slide track and shoulder aforesaid, a follower on the calipering lever abutting the pawl for urging the latter solely in the direction of the track and the shoulder of the slide, and a second yielding means operative normally to urge the calipering lever into the path of travel of the advancing coin, while the follower of said lever urges the pawl toward the track and the shoulder of the slide in opposition to the force of the yielding means first mentioned, and means on the housing limiting movement of the pawl in the direction of slide advancement.

5. A coin controlled device comprising in combination, a reciprocable slide provided with an aperture to receive a coin, a shoulder formed in a side edge of said slide, a housing reciprocably supporting the slide, a pawl shiftably mounted upon the housing for movement into and out of interfering relationship with said shoulder, means normally yieldingly urging said pawl into interfering relationship with said shoulder incident to movement of said slide to prevent a full stroke of the slide, coin calipering means on the housing adjacent to the slide and through which a coin is caused to pass incident to actuation of said slide, and coin-calipering means mounted upon the housing independently of the pawl mounting responsive to the presence of a proper sized coin in the slide aperture, for shifting said pawl out of interfering relationship with the slide shoulder to permit a full stroke of the slide.

6. The device as set forth in claim 5, wherein the housing includes a fixed abutment, the pawl being positioned to impinge upon said abutment to translate the total impact of slide advancement to the housing as said pawl engages the slide shoulder.

7. A coin controlled device comprising in combination, a slide provided with an aperture to receive a coin, said slide being reciprocable between an initial position and a position of full advancement, a housing reciprocably supporting the slide, a shoulder on the slide, a fixed impact-receiving abutment on the housing, and a stop member shiftably mounted upon the housing for movement against said fixed abutment and into interfering relationship with said slide shoulder, to limit advancement of the slide intermediate the positions aforesaid, means for testing the acceptability of a coin during advancement of the coin by the slide, and means operative upon completion of a favorable coin test, for displacing the stop member from interfering relationship with the slide shoulder as the slide moves toward fully advanced position.

8. A coin controlled device comprising in combination, a slide provided with an aperture to receive a coin, said slide being reciprocable between an initial position and a position of full advancement, a housing reciprocably supporting the slide, and including a fixed impact-receiving abutment, means on the housing for testing the acceptability of a coin during advancement of the coin by the slide, a shoulder on the slide, a stop member shiftably mounted upon the housing adjacent to said impact-receiving abutment, for movement against said abutment and into interfering relationship with said slide shoulder, to limit advancement of the slide intermediate the position aforesaid, and means controlled by the coin testing means, for moving the stop member out of interfering relationship with said slide shoulder.

9. The device as set forth in claim 8, wherein the means last mentioned is movable about one axis and said stop member is movable about another axis, said axes being spaced from one another, said housing having a rigid back-up member in position to engage said stop member at the limit of the slide interfering relationship of the stop member whereby the means for testing the acceptability of a coin receives none of the impact resulting from the impact receiving abutment engaging the stop member during advancement of the slide.

10. A coin controlled device comprising in combination, a slide provided with a plurality of apertures each to receive a coin, said slide being reciprocable between an initial position and a position of full advancement, a housing reciprocably supporting the slide, means on the housing for testing the acceptability of each coin during advancement of the coins simultaneously by the slide, a shoulder on the slide, a pair of stop members each shiftably mounted upon the housing for independent movement into interfering relationship with said slide shoulder to limit advancement of the slide intermediate the positions aforesaid, and means controlled by the coin testing means, for moving the stop members individually out of interfering relationship with said slide shoulder depending upon the acceptability of the coins advanced by the slide.

11. A coin controlled device comprising in combination, a slide provided with a pair of apertures each to receive a coin, said slide being reciprocable between an initial position and a position of full advancement, a housing reciprocably supporting the slide, shoulder means on the slide, a pair of stop members each shiftably mounted upon the housing for independent movement into interfering relationship with said slide shoulder means, to limit advancement of the slide intermediate the position aforesaid, separate means for individually testing the acceptability of the coins during advancement thereof by the slide, and means operative upon completion of favorable coin tests for displacing the stop members individually from interfering relationship with the slide shoulder means as the slide moves toward fully advanced position.

12. A coin controlled device comprising in combination, a slide provided with a plurality of apertures each to receive a coin, said slide being reciprocable between an initial position and a position of full advancement, a housing reciprocably supporting the slide, shoulder means on the slide, a pair of coin-calipers on the housing each including a shiftable lever having thereon a lug disposed normally in the path of advancement of one of the coins, for actuation by the coins, means yieldingly urging said lugs into said path of coin advancement, a pair of stop members each shiftably mounted upon the housing for movement into engagement with the shoulder means of the slide, for stopping advancement of the slide at a location intermediate the two extreme positions aforesaid, yielding means constantly urging said stop members individually toward the shoulder-engaging position, and means under the control of the coin-calipers for separately and independently withdrawing the stop members from engaging relationship with the shoulder means of the slide whenever coins of a proper size strike the lugs of the caliper levers.

13. The device as set forth in claim 12, wherein the stop members are located in side by side relationship upon the housing and beneath the slide, the slide covering and restraining said stop members in opposition to the yielding means operative thereon, throughout the major extent of slide advancement.

14. A coin controlled device comprising in combination, a slide provided with a pair of apertures each to receive a coin, said slide being reciprocable between an initial position and a position of full advancement, a housing reciprocably supporting the slide, a pair of movable means pivoted about a common axis on the housing for testing the acceptability of each coin during advancement of the coins by the slide, and a pair of separate independently movable means operatively associated with said testing means and operative incident to failure of either coin to pass the test, for limiting advancement of the slide toward the position of full advancement.

15. A coin controlled device comprising in combination, an elongate slide provided with an aperture to receive a coin, said slide being reciprocable longitudinally between forward and rearward limits, an elongate housing reciprocably supporting the slide, and a face plate for supporting the housing, said face plate including an upright portion for detachable mounting upon a panel, and a forward extension disposed angularly to the upright portion and provided with opposed side channels detachably accommodating therein the side edges of the slide housing, and means for temporarily anchoring the face plate to the slide housing.

References Cited in the file of this patent

UNITED STATES PATENTS

| | | |
|---|---|---|
| 1,151,532 | Philippsen | Aug. 24, 1915 |
| 1,158,722 | Rosenstengel | Nov. 2, 1915 |
| 1,908,380 | Tratsch | May 9, 1933 |
| 1,924,618 | Mills | Aug. 29, 1933 |
| 2,080,911 | Gammel | May 18, 1937 |
| 2,095,431 | Bugg | Oct. 12, 1937 |
| 2,116,309 | Gorton | May 3, 1938 |
| 2,206,983 | Troy | July 9, 1940 |
| 2,302,821 | Walton | Nov. 24, 1942 |
| 2,319,039 | Comfort | May 11, 1943 |
| 2,777,554 | Steiner | Jan. 15, 1957 |